US007006903B2

(12) United States Patent
Smith et al.

(10) Patent No.: US 7,006,903 B2
(45) Date of Patent: Feb. 28, 2006

(54) METHOD AND SYSTEM FOR ROUTING MOBILE VEHICLES AND SCHEDULING MAINTENANCE FOR THOSE VEHICLES RELATED APPLICATION

(75) Inventors: Barry C. Smith, Flower Mound, TX (US); Michael Clarke, Irving, TX (US); Eric Nespoulous, Paris (FR)

(73) Assignee: Sabre Inc., Southlake, TX (US)

( * ) Notice: Subject to any disclaimer, the term of this patent is extended or adjusted under 35 U.S.C. 154(b) by 45 days.

(21) Appl. No.: 10/270,000

(22) Filed: Oct. 15, 2002

(65) Prior Publication Data

US 2003/0167110 A1 Sep. 4, 2003

Related U.S. Application Data

(63) Continuation-in-part of application No. 10/084,313, filed on Feb. 28, 2002.

(51) Int. Cl.
*G05D 3/00* (2006.01)
*G06F 7/00* (2006.01)

(52) U.S. Cl. .............................. 701/3; 701/29; 701/36; 340/995; 340/500; 244/1 R

(58) Field of Classification Search .................... 701/3, 701/1, 14, 25, 30, 36, 2, 29; 340/945, 500, 340/635, 501, 540, 999; 244/1 R
See application file for complete search history.

(56) References Cited

U.S. PATENT DOCUMENTS

| | | | | |
|---|---|---|---|---|
| 4,943,919 | A * | 7/1990 | Aslin et al. | 701/3 |
| 5,657,231 | A * | 8/1997 | Nobe et al. | 701/209 |
| 6,134,500 | A | 10/2000 | Tang et al. | |
| 6,163,744 | A * | 12/2000 | Onken et al. | 701/3 |
| 6,216,109 | B1 * | 4/2001 | Zweben et al. | 705/8 |
| 6,571,171 | B1 * | 5/2003 | Pauly | 701/206 |
| 6,721,714 | B1 | 4/2004 | Baiada et al. | |
| 2002/0022984 | A1 * | 2/2002 | Daniel et al. | 705/8 |
| 2002/0156692 | A1 * | 10/2002 | Squeglia et al. | 705/26 |
| 2002/0194037 | A1 | 12/2002 | Creed et al. | |
| 2003/0050746 | A1 | 3/2003 | Baiada et al. | |
| 2005/0024189 | A1 * | 2/2005 | Weber | 340/425.5 |

OTHER PUBLICATIONS

Bard, J.F. et al., *Improving Through-Flight Schedules*, IEE Transactions, Sep. 1987, pp. 242-251.

Daskin, M.S. et al., *A Lagrangian Relaxation Approach to Assigning Aircraft to Routes in Hub and Spoke Networks*, Transportation Science, vol. 23, No. 2, May 1989, pp. 91-99.

Desaulniers, G. et al., *Daily Aircraft Routing and Scheduling*, Jun. 30, 1994, 33 pages.

(Continued)

*Primary Examiner*—Olga Hernandez
(74) *Attorney, Agent, or Firm*—Alston & Bird LLP

(57) ABSTRACT

Methods and systems for routing and scheduling maintenance for aircraft. An aircraft routing and maintenance scheduling system generates an aircraft routing proposal based on information describing a possible flight of an aircraft and a maintenance scheduling proposal that corresponds to the aircraft based on information describing a possible maintenance schedule of the aircraft. The system determines a proposed flight assignment and proposed maintenance scheduling assignment based on the aircraft routing proposal and maintenance scheduling proposal. Thereafter, the system produces a flight assignment plan and maintenance scheduling plan using the proposed flight assignment and proposed maintenance scheduling assignment when the proposed flight assignment and proposed maintenance scheduling assignment meet a decision criterion describing requirements for aircraft routing and maintenance scheduling.

46 Claims, 4 Drawing Sheets

OTHER PUBLICATIONS

Desrochers, M. et al., *A Generalized Permanent Labelling Algorithm for the Shortest Path Problem With Time Windows*, INFOR vol. 26, No. 3, 1988, pp. 191-211.

Kabbani, N. M. et al., *Aircraft Routing at American Airlines*, 1992, pp. 12-27.

Soumis, F. et al., *A Model for Large-Scale Aircraft Routing and Scheduling Problems*, Transpn. Res.-B, vol. 14B, 1980, pp. 191-201.

Talluri, K., *Swapping Applications in a Daily Airline Fleet Assignment*, Transportation Science, vol. 30, No. 3, 1996, pp. 237-248.

Clarke, L. et al., *The Aircraft Rotation Problem*, (Research Paper, Georgia Institute of Technology), Aug. 1995, pp. 1-14.

Bradley, S. P. et al., *Linear Programming in Matrix Form* (Appendix B), *Applied Mathematical Programming*, Addison-Wesley Publishing Company, pp. 675-688.

Bradley, S. P. et al., *Integer Programming, Applied Mathematical Programming*, Addison-Wesley Publishing Company, pp. 386-395.

Bradley, S. P. et al., *Large-Scale Systems, Applied Mathematical Programming*, Addison-Wesley Publishing Company, pp. 540-545.

Dantzig, G. B. et al., *The Decomposition Algorithm for Linear Programs*, Econometrics, vol. 29, No. 4, Oct. 1961, pp. 766-779.

Ahuja, R. et al., *Network Flows: Theory, Algorithms, and Applications*; Prentice-Hall, Inc., 1993; *Dantzig-Wolfe Decomposition*, Multicommodity Flows, Chap. 17, pp. 670-673.

Dantzig, G. B. et al., *Decomposition Principle For Linear Programs*, The Rand Corporation, Santa Monica, CA, Nov. 24, 1959, pp. 101-111.

Cynthia Barnhart, Natashia L. Boland, Lloyd W. Clarke, Ellis L. Johnson, George L. Nemhauser, Rajesh G. Shenoi; Flight String Models for Aircraft Fleeting and Routing; Dec., 1997; Abstract page, pp. 1-21.

* cited by examiner

METHOD AND SYSTEM FOR ROUTING MOBILE VEHICLES AND SCHEDULING MAINTENANCE FOR THOSE VEHICLES RELATED APPLICATION

This application is a continuation-in-part of U.S. application Ser. No. 10/084,313, filed Feb. 28, 2002, the disclosure of which is expressly incorporated herein by reference in its entirety.

FIELD OF THE INVENTION

The present invention relates generally to data processing systems and, more particularly, methods and systems for routing mobile vehicles and scheduling maintenance for those vehicles.

BACKGROUND OF THE INVENTION

Traditionally, many airline carriers manually assign routes to aircraft. This usually involves having experts allocate all candidate flight segments to specific aircraft tail numbers (unique sequence of alphanumeric characteristics used to identify a specific aircraft) within a given sub-fleet of the airline. In addition to any requirements of the flight segments, the experts must ensure the allocations meet the operational and maintenance requirements of the aircraft. Considering that some carriers may have hundreds of aircraft and thousands of flights scheduled over a given time period (e.g., a month), this can be a complex and cumbersome process. This problem is not necessarily unique to the airline industry, it applies to carriers of other modes of transportation.

Further, during the normal operations of a carrier, situations may often develop wherein modifications have to be made to the existing schedule plan. For example, an aircraft may unexpectedly be grounded, thus leaving all flights that were assigned to the aircraft's route without an aircraft. Since most carriers would not willingly give up the revenues generated by the flights, experts must re-allocate and shift resources in order to accommodate the orphaned flights. If this happens only on rare occasions, then the traditional manual approach might be acceptable.

In other instances, however, airlines may find it necessary to adjust their flight schedules on a regular basis. For example, passenger demand may require daily adjustments to flight schedules because the demand inherently varies over the course of the week. Manually re-planning the assignments of the aircraft and flights to accommodate these adjustments may be inefficient. Further, given the necessity to produce a plan within short time constraints, a generated plan may not be fully calculated to maximize revenues for the airline.

Civil aviation regulations require that all aircraft undergo maintenance after a certain number of flying hours, cycles, and calendar dates. If certain checks are not performed within the specified period, civil aviation authority rules prohibit the aircraft from flying. Thus an airline often schedules aircraft maintenance earlier than required to provide some slack (e.g., extra flying hours) if a routing is disrupted and more flying is needed to arrive at the maintenance station. Airlines typically route aircraft to satisfy a prescribed pattern of movement throughout their network system to ensure that it is possible to conduct maintenance events. Maintenance events beyond nominal line maintenance are usually pre-assigned by the maintenance and engineering department, and it is the responsibility of the maintenance tracker in the airline operations control center to make sure maintenance requirements are met. Accordingly, the aircraft tail assignment process does not usually allow the tracker to modify the existing plan for other than nominal maintenance events.

SUMMARY OF THE INVENTION

Methods and systems consistent with the present invention facilitate routing and scheduling maintenance for aircraft. An aircraft routing and maintenance scheduling system generates an aircraft routing proposal based on information describing a possible flight of an aircraft and a maintenance scheduling proposal that corresponds to the aircraft based on information describing a possible maintenance schedule of the aircraft. The system also determines a proposed flight assignment and proposed maintenance scheduling assignment based on the aircraft routing proposal and maintenance scheduling proposal. The system determines whether the proposed flight assignment and proposed maintenance scheduling assignment meet a decision criterion describing requirements for aircraft routing and maintenance scheduling. Based on a determination that the decision criterion is not met, the system optimizes the proposed flight assignment and proposed maintenance scheduling assignment so that the decision criterion is met. Thereafter, the system generates a flight assignment plan and maintenance scheduling plan using the proposed flight assignment and proposed maintenance schedule that met the decision criterion.

Other methods and systems consistent with the present invention also facilitate routing and scheduling maintenance for aircraft. An aircraft routing and maintenance scheduling system receives information describing a possible flight of an aircraft and a possible maintenance schedule of the aircraft and generates a set of aircraft routing proposals and maintenance scheduling proposals based on the received information. The system inputs the proposals into an optimization-based model. Thereafter, the system produces a flight assignment plan and maintenance scheduling plan by solving the optimization-based model.

Other methods and systems consistent with the present invention also facilitate routing and scheduling maintenance for aircraft. An aircraft routing and maintenance scheduling system generates an aircraft routing proposal based on information describing a possible flight of an aircraft and a maintenance scheduling proposal that corresponds to the aircraft based on information describing a possible maintenance schedule of the aircraft. The system determines a proposed flight assignment and proposed maintenance scheduling assignment based on the aircraft routing proposal and maintenance scheduling proposal. Thereafter, the system produces a flight assignment plan and maintenance scheduling plan using the proposed flight assignment and proposed maintenance scheduling assignment when the proposed flight assignment and proposed maintenance scheduling assignment meet a decision criterion describing requirements for aircraft routing and maintenance scheduling.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

The following detailed description of the invention refers to the accompanying drawings. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

Overview

Methods and systems consistent with the present invention provide a maintenance scheduling model that incorporates aspects of maintenance scheduling into an aircraft tail assignment process. The model considers predefined maintenance rules for each fleet type, current maintenance counter data, maintenance station capability and capacity, and pre-assigned maintenance events. The model maximizes aircraft utilization, and if necessary, schedules required maintenance checks at eligible airport stations along the aircraft routing. In effect, the model tries to minimize the amount of wasted remaining flying time (e.g., time remaining until maintenance is needed/required) and cycles between maintenance events. Because it explicitly incorporates station capacity/capability, the model will not over schedule maintenance events at a given station and has the ability to consider station capacity/capability by time.

Network Environment

Figure 1:
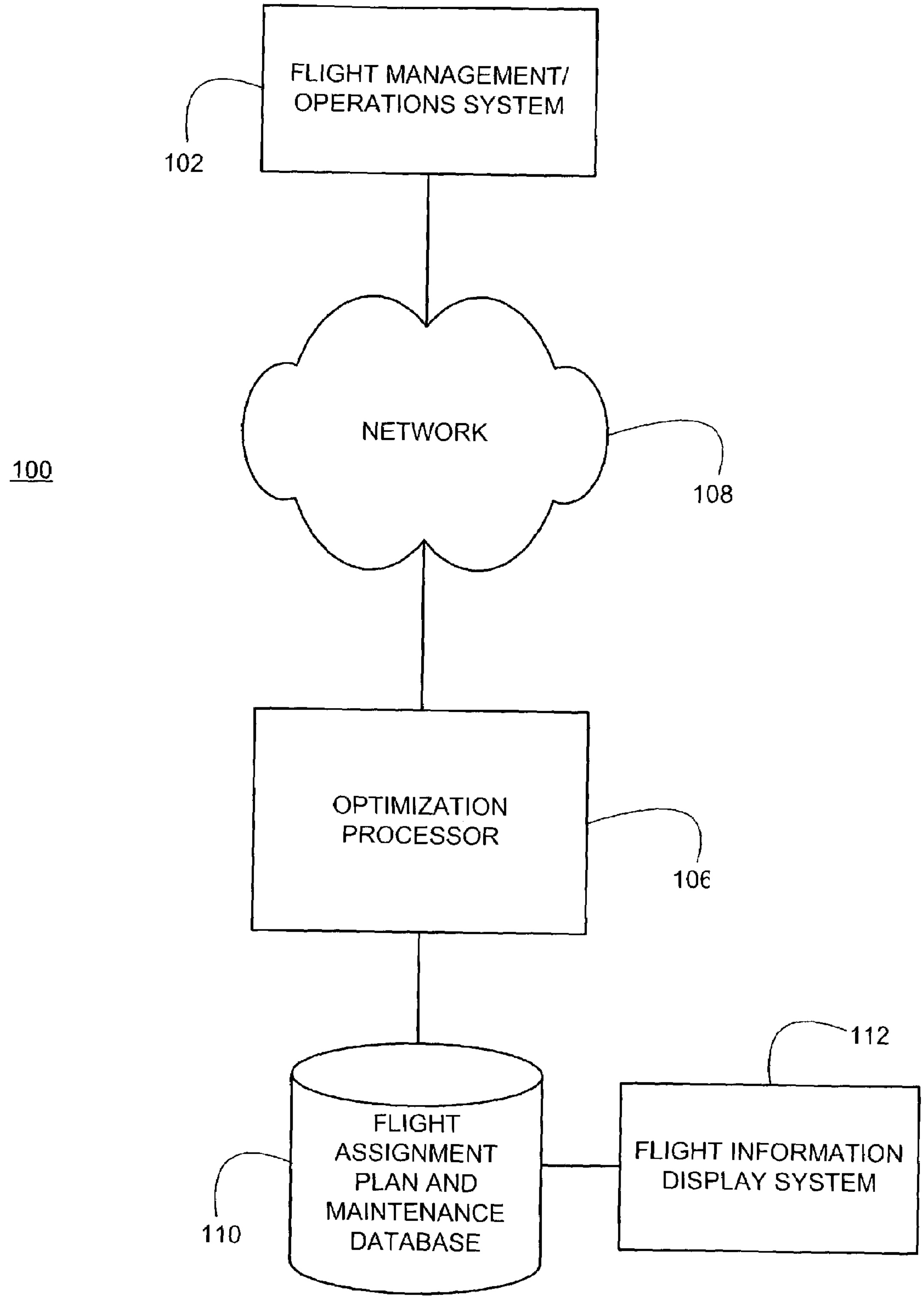
FIG. 1 is a diagram of an exemplary network environment in which features and aspects consistent with the present invention may be implemented.

FIG. 1 illustrates an exemplary aircraft routing and maintenance scheduling system 100 in which features and principles of the present invention may be implemented. The aircraft routing and maintenance scheduling system 100 includes a flight management/operations system 102, an optimization processor 106, a network 108 connecting the flight management/operations system 102 and the optimization processor 106, a flight assignment plan and maintenance database 110, and a flight information display system 112. The processor 106 is coupled to the flight assignment plan and maintenance database 108. The flight assignment plan and maintenance database 108 is coupled to a flight information display system 112. While FIG. 1 shows only one computer system 102 providing information to the aircraft routing and maintenance scheduling system 100, the system 100 may receive information from any number of sources (e.g., additional computer systems, reports, etc.). The components of FIG. 1 may be implemented through hardware, software, and/or firmware. The number of components in aircraft routing and maintenance scheduling system 100 is not limited to what is shown.

Flight management/operations system 102 may include aircraft information, flight information, passenger information, maintenance counter information, maintenance event information, maintenance rule information, maintenance station capability information, and maintenance station capacity information to be used in determining a flight assignment plan and maintenance scheduling plan. For instance, the flight management/operations system 102 may be the Sabre AirOps, Sabre Flight Operating System, or similar system used by airlines for monitoring and scheduling daily maintenance and flight operations and tracking aircraft position. The flight information may include information describing the scheduled flight, such as flight origin, destination, start time, end time, block time (e.g., length of flying time for flight), booked passenger loads, passenger revenue/fare, assigned aircraft family type, assigned crew rating, minimum equipment list (MEL) restrictions, operating restrictions, aircraft information, maintenance information, and/or other information associated with the flight. The MEL restrictions may further include auxiliary power unit (APU), extended-range twin-engine operations (ETOPS), traffic alert and collision avoidance system (TCAS), and/or other equipment restrictions. The operating restrictions may further include flight range, noise rating of aircraft assigned to the flight, whether the flight will be over water, and/or other restrictions that may affect the desired flight route.

The aircraft information may include tail identification, aircraft maintenance group, hourly operating cost, current location, ready time, remaining flight time, passenger capacity, aircraft family type, crew rating, MEL capability, and/or other information associated with the aircraft. The maintenance event information may include aircraft tail, type of maintenance check, scheduled location, start time, end time, and/or other information required to properly route aircraft for maintenance. The maintenance counter information may include aircraft tail, type of maintenance check, calendar date, block time, flying time, remaining flying cycles, and/or other information required to properly schedule maintenance.

The maintenance rule information may include aircraft maintenance group, type of maintenance check, maintenance event duration, physical capacity, required man power, calendar date, block time, flying time, flying cycles between checks, and/or other information required to properly schedule maintenance. The maintenance station capability information may include airport code, physical capacity, man power capacity, effective date, discontinuous date, and/or other information required to properly schedule maintenance. The maintenance station capacity information may include airport code, aircraft maintenance group, maintenance check type, effective date, discontinuous date, and/or other information required to properly schedule maintenance.

Network 108 may include a public network such as the Internet or a telephony network, a private network, a virtual private network, or any other mechanism for enabling communication between two or more nodes or locations. Network 108 may include one or more of wired and wireless connections. Wireless communications may include radio transmission via the airwaves, however, those of ordinary skill in the art will appreciate that various other communication techniques can be used to provide wireless transmission including infrared line of sight, cellular, microwave, satellite, Bluetooth packet radio and spread spectrum radio. Wireless data may include, but is not limited to, paging, text messaging, e-mail, Internet access and other specialized data applications specifically excluding, or including voice transmission.

In some instances consistent with the invention, the network 108 may include a courier network (e.g. postal service, United Parcel Service, Federal Express, etc.). Other types of networks that are to be considered within the scope of the invention include local area networks, metropolitan area networks, wide area networks, ad hoc networks, and/or any mechanism for facilitating communication between two nodes or remote locations.

Flight assignment plan and maintenance database 110 may be used to store a flight assignment plan and a maintenance schedule plan generated by optimization processor 106 as described later herein. Database 110 may comprise storage media, such as magnetic storage devices, optical storage devices, organic storage devices, random access memory, printed media, and/or any other medium for storing information. While database 110 has been illustrated as a single database, one of ordinary skill in the art will appreciate that multiple databases may be utilized.

Flight information display system 112 may be used to access the stored flight assignment plan and stored maintenance schedule plan in database 110. Flight information display system 112 may be part of a Sabre airport product suite or any information system used to communicate the most current flight schedule within the airline and at various airport stations in the airline network.

Figure 2:
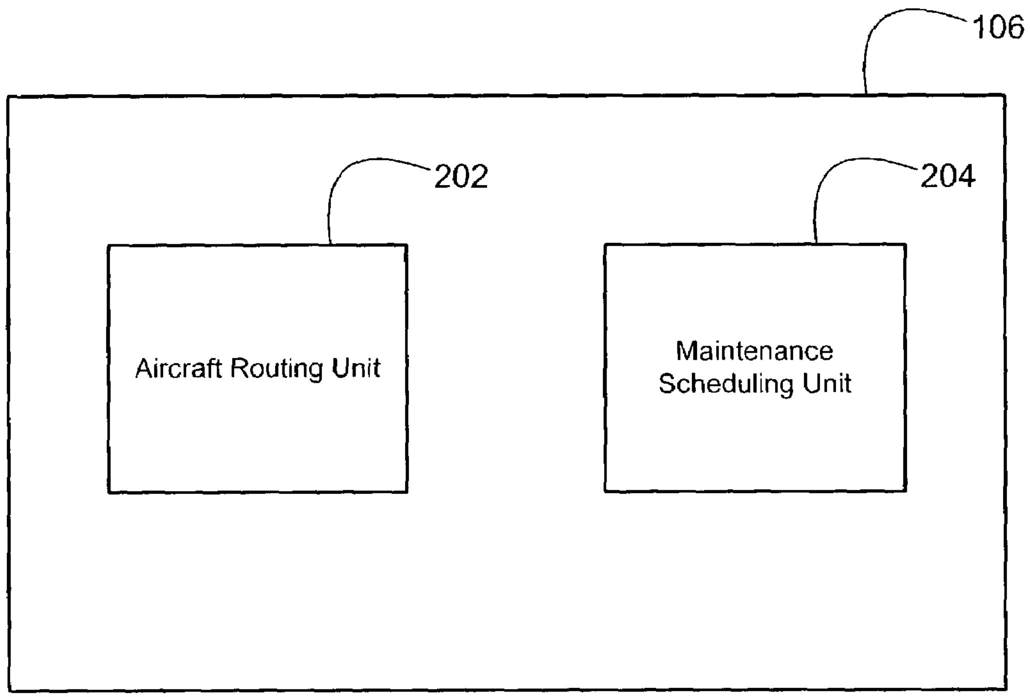
FIG. 2 is a diagram of an exemplary optimization processor consistent with the present invention.

FIG. 2 is a diagram of an exemplary optimization processor 106 consistent with the present invention. An optimization processor 106 may include at least an aircraft routing unit 202 and a maintenance scheduling unit 204. Aircraft routing unit 202 is operable to aid in the generation of aircraft routing proposals as explained below with reference to FIGS. 3A and 3B. Aircraft routing unit 202 may be software used for object-oriented constraint programming. Aircraft routing unit 202 may include classes of objects that represent aspects such as routing plans themselves, their visits, their vehicles, and their constraints, such as capacity or time-window constraints.

Maintenance scheduling unit 204 is operable to aid in the generation of maintenance scheduling proposals as explained below with reference to FIGS. 3A and 3B. Maintenance scheduling unit 204 may also be software used for object-oriented constraint programming. Maintenance scheduling unit 204 may comprise a library of classes and functions that offer a natural object model for the mathematical representation of finite capacity scheduling and resource allocation problems. Maintenance scheduling unit 204 may include a library of temporal and capacity constraints defined in terms of activities and resources. An activity is the task or work to be performed in a schedule, and has a prescribed duration-it executes over a specific interval of time, which may be subject to temporal constraints and require resources. Activities are linked to other activities by temporal constraints. Activities are linked to resources by resource constraints. Resources may be subject to different kinds of capacity limitations.

As noted above, aircraft routing unit 202 and maintenance scheduling unit 204 may be implemented using constraint programming software. Below is a general discussion of several of the concepts behind constraint programming. Aircraft routing 202 and maintenance scheduling unit 204 may operate according to these principles.

Constraint Satisfaction Problems

A constraint satisfaction problem (CSP) can be formally defined using terminology of mathematical programming. Given a set of n decision variables x1,x2, . . . , xn, the set Dj of allowable values for each decision variable xj, j=1, . . . , n, is called the domain of the variable xj. The domain of a decision variable can be any possible set, operating over any possible set of symbols. There is no restriction on the type of each decision variable, and hence decision variables can take on integer values, real values, set elements, or even subsets of sets.

Formally, a constraint c(x1,x2, . . . , xn) is a mathematical relation, i.e., a subset S of the set D1×D2×. . .×Dn, such that if (x1, x2, . . . , xn) ∊ S, then the constraint is said to be satisfied. Alternatively, we can define a constraint as a mathematical function f: D1×D2×. . .×Dn →{0,1} such that f(x1, x2, . . . , xn)=1 if and only if c(x1, x2, . . . , xn) is satisfied. Using this functional notation, we can then define a constraint satisfaction problem as:

Given n domains D1,D2, . . . ,Dn and m constraints f1, f2, . . . , fm, find x1,x2, . . . ,xn such that fk(x1,x2, . . . ,xn)=1, 1<=k<=m xj∊Dj 1<=j<=n Note that this problem is only a feasibility problem, and that no objective function is defined. Nevertheless, CSPs are an important class of combinatorial optimization problems. It is important to note here that the functions fk do not necessarily have closed mathematical forms (e.g., functional representations), and can simply be defined by providing the set S described above. A solution to a CSP is simply a set of values of the variables such that the values are in the domains of the variables, and all of the constraints are satisfied.

With regards to optimization, constraint programming systems also allow an objective function to be specified. Notationally, we denote the objective function as g: D1×D2×. . .×Dn→ℜ, so that at any feasible point to the CSP, the function g(x1,x2, . . . ,xn) can be evaluated. For ease of exposition, we will assume that we are minimizing this objective function. An optimization problem can then be stated as Minimize g(x1,x2, . . . ,xn)

Subject to fk(x1,x2, . . . ,xn)=1, 1<=k<=m xj∊Dj 1<=j<=n

Constraint Propagation and Domain Reduction

When a constraint is defined as a mathematical function f(x1,x2, . . . ,xn) of the variables, it is assumed that there is an underlying mechanism that allows the domains of the variables to be maintained and updated. When a variable's domain is modified, the effects of this modification are then propagated to any constraint that interacts with that variable. For each constraint, a domain reduction algorithm is then programmed that modifies the domains of all the variables in that constraint, given the modification of one of the variables in that constraint. The domain reduction algorithm for a particular kind of constraint discovers inconsistencies among the domains of the variables in that constraint by removing values from the domains of the variables. If a particular variable's domain becomes empty, then it can be determined that the constraint cannot be satisfied, and an earlier choice can be undone. A crucial difference between the procedures used in mathematical programming presolve implementations and domain reduction algorithms is that in constraint programming, the domains can have holes, while in mathematical programming, domains are intervals.

Given a set of variables with their domains and a set of constraints on those variables, a constraint programming system will apply the constraint propagation and domain reduction algorithm in an iterative fashion to make the domains of each variable as small as possible, while making the entire system arc consistent. Given a constraint fk as stated above and a variable xj, a value d∊ Dj is consistent with fk if there is at least one assignment of the variables such that xj=d and fk=1 with respect to that assignment. A constraint is then arc consistent if all of the values in the domains of all the variables involved in the constraint are consistent. A constraint system is arc consistent if all of the corresponding constraints are arc consistent. The term arc is used because the first CSP's were problems with constraints stated on pairs of variables, and hence this system can be viewed as a graph, with nodes corresponding to the variables and arcs corresponding to the constraints. Arc consistency enables the domains of the variables to be reduced while not removing potential solutions to the constraint satisfaction problem.

The standard search procedure used is to first find a feasible solution to the CSP, while ignoring the objective function g(x1,x2, . . . ,xn). Let y1, y2, . . . , yn represent such a feasible point. The search space can then be pruned by adding the constraint g(y1,y2, . . . ,yn)>g(x1,x2, . . . ,xn) to the system, and continuing the search. The constraint that is added specifies that any new feasible point must have a better objective value than the current point. Propagation of this constraint may cause the domains of the decision variables to be reduced, thus reducing the size of the search space. As the search progresses, new points will have progressively better objective values. The procedure concludes until no feasible point is found. When this happens, the last feasible point can be taken as the optimal solution.

Programming Search

Given a CSP, the constraint propagation/domain reduction algorithm can be applied to reduce the domains of the variables so as to arrive at an arc consistent system. However, while this may determine if the CSP is infeasible, it does not necessarily find solutions of a CSP. To do this, one must program a search strategy (or use a default search strategy, if one is provided by the constraint programming system). Traditionally, the search facilities provided by a constraint programming system have been based on depth first search. The root node of the search tree contains the initial values of the variables. At each node, the user programs a goal, which is a strategy that breaks the problem into two (or more) parts, and decides which part should be evaluated first.

A simple strategy might be to pick a variable, and to try to set that variable to the different values in the variable's domain. This strategy creates a set of leaves in the search tree and creates what is called a choice point, with each leaf corresponding to a specific choice. The goal also orders the leaves amongst themselves within the choice point. In the next level of the tree, the results of the choice made at the leaf are propagated, and the domains are reduced locally in that part of the tree. This will either produce a smaller arc consistent system, or a proof that the choice made for this leaf is not possible. In this case, the system automatically backtracks to the parent and tries other leaves of that parent. The search thus proceeds in a depth first manner, until at a node low in the tree a solution is found, or until the entire tree is explored, in which case the CSP is found to be infeasible. The search strategy is enumerative with constraint propagation and domain reduction employed at each node to help prune the search space.

Maintenance Scheduling Model

Figure 3A:
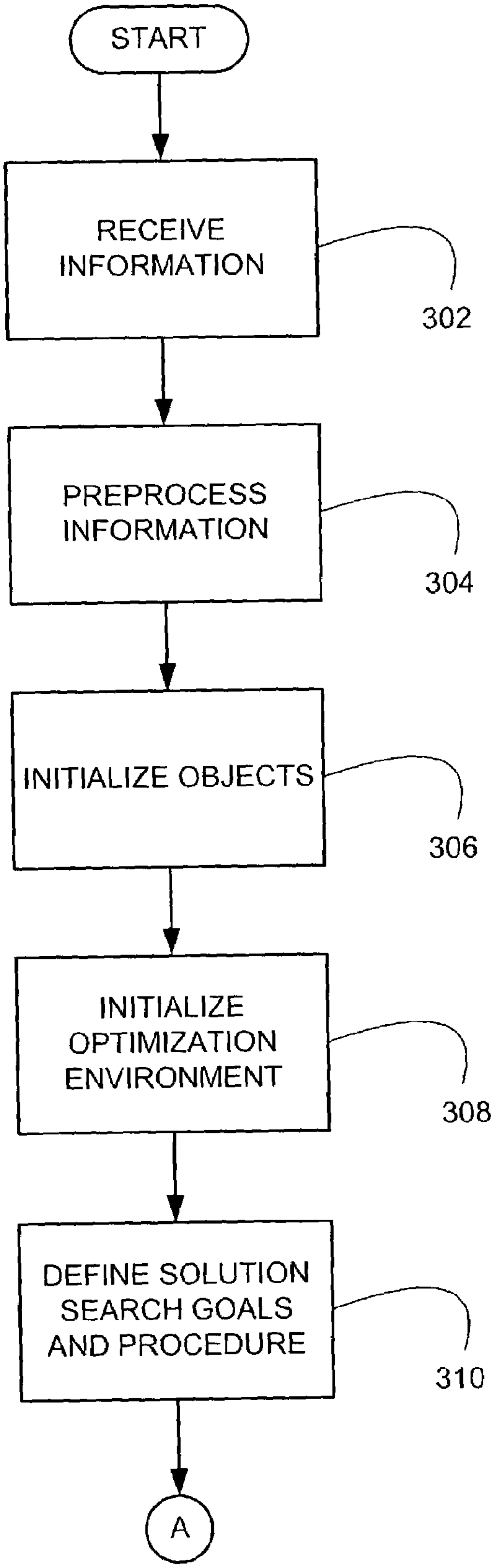
FIGS. 3A and 3B represent an exemplary flow chart of a process for implementing the maintenance scheduling model consistent with the present invention.
Figure 3B:
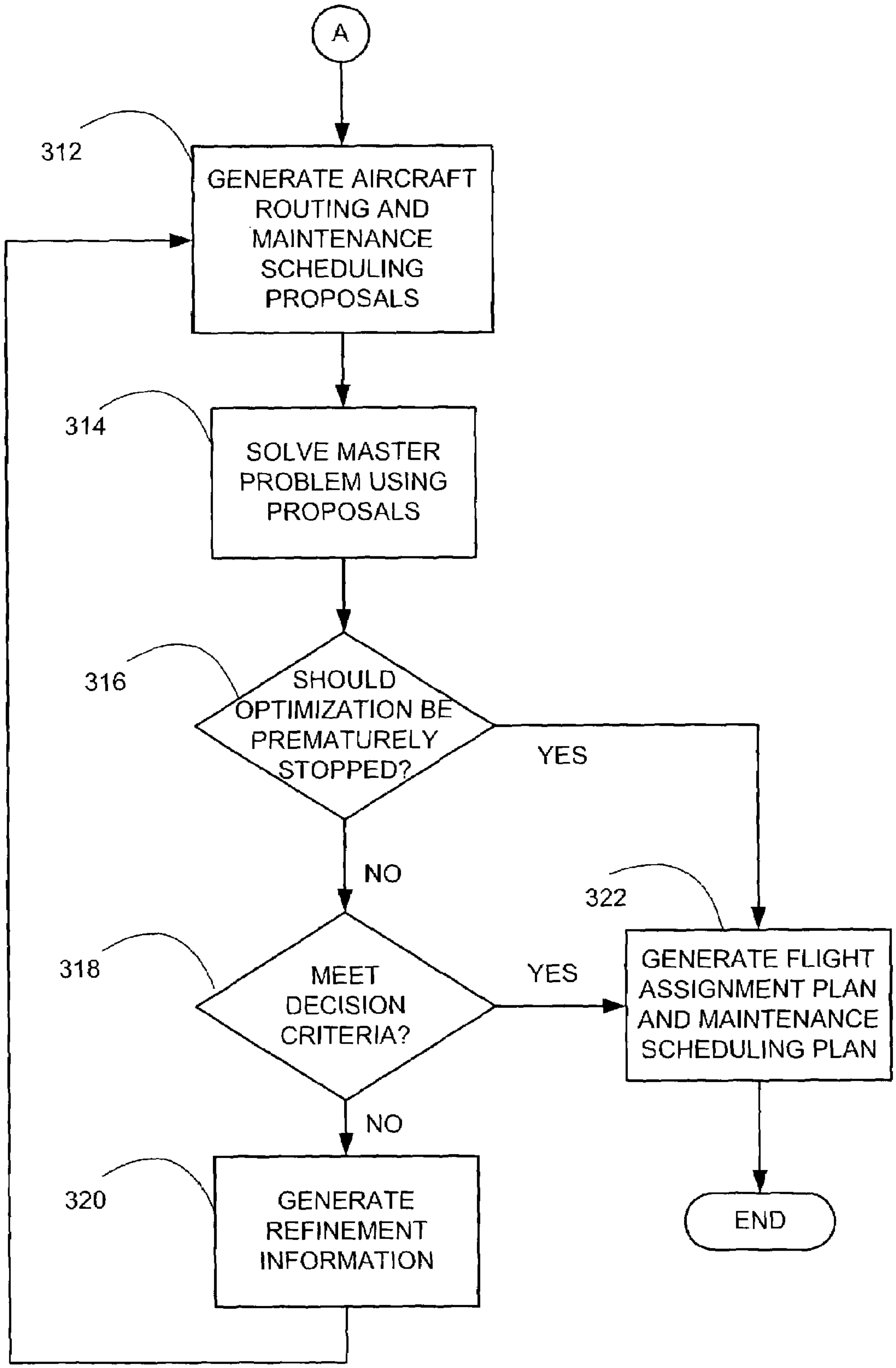

Optimization processor 106 may be configured to implement the exemplary aircraft routing and maintenance scheduling method illustrated in the flowchart of FIGS. 3A and 3B. Processor 106 may be implemented using any type of computer processor, such as a personal computer, workstation, mainframe, application specific integrated circuit, etc. Processor 106 may receive information from the flight management/operations system 102 via network 108 (step 302). Received information may include aircraft information, flight information, passenger information, maintenance counter information, maintenance event information, maintenance rule information, maintenance station capability information, and/or maintenance station capacity information.

After receiving information, processor 106 may preprocess the received information (step 304). Preprocessing information may involve mapping various of the received information to each other. Information is mapped together to make it easier to use in the maintenance scheduling model. For example, maintenance rules information may be mapped to maintenance capacity information and maintenance capability information. Maintenance events information may be mapped to aircraft information. Maintenance counter information may also be mapped to aircraft information. Mapping may be implemented by associating pointers with the appropriate information.

Processor 106 also initializes various objects for use in generating aircraft routing proposals and maintenance scheduling proposals (step 306). These objects may be associated with aircraft routing unit 202 and/or maintenance scheduling unit 204 in processor 106. Objects may be instantiated in memory resident in processor 106 and the received information from step 302 may be associated with the instantiated objects. The objects may include flight objects, maintenance objects, aircraft objects, maintenance hangar objects, and maintenance rule objects.

A flight object corresponds to an activity that requires an aircraft, consumes one flying cycle and a prescribed amount of flying time, block time, and calendar time. There may be a flight object for each scheduled flight in the network. A flight object may also be referred to as a visit object in the context of aircraft routing unit 202. A maintenance object corresponds to an activity that requires a given aircraft, and produces a prescribed amount of flying cycles, flying time, block time, and calendar time. There may be a maintenance object for each scheduled or suggested maintenance occurrence. A maintenance object may also be referred to as a visit object in the context of aircraft routing unit 202. The class of maintenance objects has two subclasses, namely maintenance event objects and maintenance check objects. Maintenance event objects are used to define each scheduled maintenance event. Maintenance check objects are used to define each suggested maintenance check.

An aircraft object corresponds to a vehicle that is capable of providing a given amount of flying cycle, flying time, and block time over a prescribed calendar time. There may be an aircraft object for each operational aircraft in the fleet. In the context of maintenance scheduling unit 204, each aircraft may be modeled as a unary resource. A maintenance hangar object corresponds to a discrete resource used to represent available maintenance capacity at a station based on station capability. There may be a maintenance hangar object for each station in the network. A maintenance rule object corresponds to an array of dimensions used to monitor the variation in corresponding maintenance parameters over the course of the scheduling process. There may be a maintenance rule object for each maintenance rule in the network.

After the objects have been initialized, processor 106 initializes the optimization environment (step 308). During this initialization step, processor 106 defines relevant constraints, dimensions, and objective values which may be needed by aircraft routing unit 202 and maintenance scheduling unit 204. These constraints, dimensions, and objective values may be supplied to processor 106 by a user or they may be automatically generated by processor 106.

Processor 106 may define a number of dimensions associated with the model. Dimensions may also be known as maintenance parameters and are essentially parameters related to an aircraft that are affected by the maintenance scheduling of that aircraft. Dimensions may include values such as block time, flying time, flying cycles (e.g., number of cycles remaining until maintenance is needed), and calendar date. In one embodiment, processor 106 may define the dimensions for each aircraft based on the received maintenance counter information. In this manner, the dimensions are set to the relevant current values for each aircraft.

Constraints may include aircraft constraints, flight constraints, operational constraints, maintenance constraints, hangar constraints, vehicle constraints, special sequence constraints, temporal constraints, and vehicle compatibility constraints. For each aircraft and its associated maintenance parameters (e.g., calendar time, block time, flying time, and flying cycle), aircraft constraints ensure that an assigned activity (e.g., visit) will not exceed the maximum value for each parameter, as specified by the corresponding maintenance rule. Maintenance parameters may also be referred to as dimensions. Flight constraints specify, for each scheduled flight, the needed change in each maintenance parameter defined in the model. For example, once a flight is assigned to an aircraft, the corresponding parameters may be increased or decreased. Operational constraints ensure, for each scheduled flight, that the assigned vehicle (e.g., aircraft) is operationally compatible based on minimum equipment list (MEL) requirements and specified assignment criteria. Examples of MEL requirements may include auxiliary power unit (APU), extended-range twin-engine operations (ETOPS), de-icing, traffic collision avoidance system (TCAS), thrust reverser, and/or over-water. Examples of specified assignment criteria may include aircraft type, crew, aircraft family, and/or fleet.

Maintenance constraints specify, for each maintenance activity (e.g., visit), the needed change in each maintenance parameter defined in the model. For example, once an aircraft goes in for maintenance, the corresponding parameters may be reset. Hangar constraints ensure, for each maintenance activity, that a station is capable of performing the activity, and that the required maintenance capacity is available over a prescribed time period. Vehicle constraints ensure, for each maintenance activity, that the candidate aircraft can be assigned to the activity based on a prescribed equipment type and maintenance type.

Spacial sequence constraints enforce the sequence of visits (e.g., activities) based only on their geographical location (as the calendar time dimension is enforced separately by temporal constraints). Temporal constraints ensure that each visit (e.g., activity) is compatible with corresponding neighbors based on start and end times, which are represented with the calendar time parameter in the model. Vehicle compatibility constraints ensure that the sequencing of each visit (e.g., activity) accounts for the compatibility of the candidate vehicle (e.g., aircraft) in the model.

Processor 106 also may define a number of objective values associated with the model. Processor 106 may define various objective values by quantifying the value of parameters associated with the model based on the information received in step 302. Objective values may include flight objective values, aircraft objective values, and maintenance objective values. Flight objective values may include net operating revenue based on payload (passengers and cargo). Aircraft objective values may include aircraft operating costs, including both fixed and variable costs. The costs include, but are not limited to, fuel, ownership or leasing, insurance, and overhead costs. Maintenance objective values may include the benefit of performing a given maintenance activity at a corresponding station. In one embodiment, the benefit may be measured based on the amount of "unused" maintenance dimensions remaining if the maintenance activity is performed.

Once the optimization environment has been initialized, solution search goals and procedure may be defined (step 310). A user may provide processor 106 with the search goals and procedure. Both aircraft routing unit 202 and maintenance scheduling unit 204 may have goals associated with them. A search goal is a procedure that specifies the order of instantiation of decision variables and their values in corresponding domains within a search tree of a constraint programming model. There are at least two ways of controlling the direction in which the search tree corresponding to a constraint programming model is to be expanded. These include: 1) model variable instantiation ordering—specifies the sequence in which variables are chosen for instantiation; and 2) variable domain value ordering—specify the sequence in which domain values are chosen for instantiation for each variable in the model. In one embodiment, the search goals associated with aircraft routing unit 202 and maintenance scheduling unit 204 include the following list:

1. Set Search Limit—determine the time limit for the search process based on the defined search goals, and corresponding objectives. This applies to the overall search process.
2. Generate Aircraft Routing—for each operational aircraft in the fleet, generate a routing consisting of a sequence of flights, and required maintenance activities
3. Schedule the maintenance activities (already sequenced during the previous step).
   a. Set Start Times—for each activity, determine its earliest start time in order to efficiently schedule all activities in a chronological order.
4. Schedule Maintenance Checks—for each aircraft, determine whether a maintenance activity is required based on each maintenance parameter (block time, flying time, flying cycles, calendar date).
5. Determine the flights/maintenance activities not performed.
   a. Schedule Unperformed Maintenance Events—for each unassigned maintenance activity of a given type, determine an eligible aircraft that requires such maintenance, and try to schedule the event (location, time).
   b. Schedule Unperformed Flights—for each unassigned flight segment, determine an eligible aircraft that can be assigned to cover the flight, satisfying operational restrictions.
6. Update the objective best value that will be used as n upper bound for the next search iteration.
   a. Set Objective Value—for each activity (maintenance event or flight), update the corresponding contribution to achieving the specified objective.

Additional or alternative search goals may also be utilized. Based on the search goals, a solution procedure may be defined. For example, processor 106 may determine an order in which aircraft routing unit 202 and maintenance scheduling unit 204 may attempt to successfully complete the search goals. A user may provide processor 106 with this order, or the order may be produced automatically. The different goals performed in the generated order function as the solution procedure.

Aircraft routing unit 202 and maintenance scheduling unit 204 may then use the search goals, search procedure, dimensions, constraints, objectives, and objects to generate an aircraft routing proposal and maintenance scheduling proposal (step 312). The aircraft routing proposal and maintenance scheduling proposal are generated based on constraint programming techniques. Aircraft routing unit 202 and maintenance scheduling unit 204 may operate in parallel, where information generated from aircraft routing unit 202 may be used as input to maintenance scheduling unit 204 and vice versa. Aircraft routing unit 202 and maintenance scheduling unit 204 use an iterative process that may involve backtracking in order to find feasible solutions. During the course of backtracking, a previous decision (e.g., assigned flight or maintenance activity) can be undone (e.g., changed) in order to find an alternate solution.

For each aircraft (e.g., vehicle) in a fleet, aircraft routing unit 202 may try to assign scheduled flights (e.g., activities) to the aircraft while preserving scheduled maintenance event (e.g., activities), considering the constraints and search goals provided in step 308. In parallel, maintenance scheduling unit 204 may generate and assign additional maintenance checks (e.g., activities) to the corresponding aircraft tail based on the state of maintenance parameters (e.g., block time, flying time, flying cycles, calendar date) along the current aircraft routing.

For each maintenance station within the airline network, maintenance scheduling unit 204 may monitor and control the number of maintenance activities (events or checks) that are performed at the location based on the station's maintenance capability and maintenance hangar capacity. The timing and location of each maintenance activity may be based on geographical and spatial conditions derived from the partial aircraft routing, as well as the state of the maintenance parameters.

After the aircraft routing proposal and maintenance scheduling proposal has been generated, processor 106 proceeds to use the aircraft routing proposal and the maintenance scheduling proposal to solve a master problem (step 314). Solving the master problem results in the generation of proposed flight assignments and proposed maintenance scheduling assignments. The proposed flight assignments and proposed maintenance scheduling assignments represent the best attempt so far by the processor 106 in assigning aircraft to flights and scheduling maintenance for aircraft (e.g., assigning maintenance stations for maintenance events of aircraft at particular times) based on the received information from step 302 (master problem described below). More particularly, the processor 106 uses the received information to create proposed flight assignments and maintenance scheduling assignments for each aircraft. The proposed flight assignments and proposed maintenance scheduling assignments are generated to meet a decision criteria, such as maximizing net revenue, minimizing the amount of wasted remaining flying time and cycles between maintenance events and/or some other criteria.

In determining the proposed flight assignments and maintenance scheduling assignments, the processor 106 may organize the aircraft routing proposal, maintenance scheduling proposal and any other required constraints in the received information into a master problem. For example, the aircraft routing proposal generated at step 312 is represented by the variable $ASSIGN_{arf}$ for all flights 'f' covered by routing 'r' assigned to aircraft 'a'. The processor 106 organizes the values of $ASSIGN_{arf}$ into the master problem by using them as coefficients in Equation MRM2 of the master problem. The maintenance scheduling proposal generated at step 312 is represented by the variable $MAINT_{amt}$ for all maintenance stations 'm' required for an event of aircraft 'a' at time 't'. The processor 106 organizes the values of $MAINT_{amt}$ into the master problem by using them as coefficients in Equation MRM3 of the master problem.

A simplex method, revised simplex method, or any other method compatible with the invention may be used to determine the proposed flight assignments and maintenance scheduling assignments based on the aircraft routing proposal and maintenance scheduling proposal generated by the sub-problem (e.g., in step 312). For example, the processor 106 may create the master problem comprising Equations OF1 and MRM1–MRM3 shown below, wherein the variables are defined in Table 1. The objective function (Equation OF1) maximizes the net revenue across the entire fleet. Equation MRM1 ensures that each scheduled flight is covered once across the entire fleet of aircraft. Equation MRM2 ensures each operational aircraft is assigned to at most one routing. Equation MRM3 restricts the number of maintenance events assigned to an eligible airport station within a prescribed time period.

$$\text{Maximize} \sum_{a \in A} \sum_{i \in R(a)} ANR_{ai} \times Route_{ar} + \sum_{a \in A} \sum_{m \in M(a)} \sum_{t \in T} \beta_{amt} MtcActivity_{amt} \tag{OF1}$$

Subject To:

$$\text{Flow} \quad \sum_{r \in R(a)} FLOW_{ar} \times ROUTE_{ar} = 1 \forall\, a \in A \tag{MRM1}$$

$$\text{Flight Cover} \quad \sum_{a \in A} \sum_{r \in R(a)} ASSIGN_{arf} \times Route_{ar} + Openflying_f = 1 \forall\, f \in F \tag{MRM2}$$

$$\text{Maint. Capacity} \sum_{i \in R(a)} MAINT_{amt} \times MtcActivity_{amt} \le MtcCapacity_{mt} \forall\, t \in A, \forall\, m \in M \tag{MRM3}$$

TABLE 1

| Variable | Definition |
|---|---|
| F | set of scheduled flight legs |
| A | set of operational aircraft |
| T | set of time periods |
| M | set of maintenance stations |
| M(a) | subset of maintenance stations eligible to handle aircraft 'a' |
| R(a) | set of maintenance feasible routing for aircraft 'a' |
| $ANR_{ar}$ | net revenue for assigning aircraft 'a' to routing 'r' |
| $\beta_{amt}$ | benefit of assigning mtcActivity to aircraft 'a' at station 'm' and time 't' |
| $ASSIGN_{arf}$ | 1 if flight 'f' is covered by routing 'r' that is assigned to aircraft 'a', 0 otherwise |
| $FLOW_{ar}$ | 1 if routing 'r' is a feasible candidate for aircraft 'a' |

TABLE 1-continued

| Variable | Definition |
|---|---|
| $MAINT_{amt}$ | 1 if maintenance station 'm' is required for an event of aircraft 'a' at time 't', 0 otherwise |
| $Route_{ar}$ | 1 if aircraft 'a' is assigned to routing 'r', 0 otherwise |
| $Openflying_{f}$ | 1 if flight 'f' is not covered, 0 otherwise |
| Mtc $Activity_{amt}$ | 1 if mtcActivity (event or check) at station 'm' is used for aircraft 'a' in time 't', 0 otherwise |
| Mtc $Capacity_{mt}$ | maintenance station capacity (input data) for a given station 'm' at time 't' |

As one of ordinary skill in the art will appreciate, the processor 106 may determine proposed flight assignments using a revised simplex method as described by Stephen Bradley, Arnoldo Hax, and Thomas Magnanti in "Applied Mathematical Programming", Addison-Wesley Publishing Company, Reading, Mass., 1977, pp. 675–686, which is incorporated herein by reference in its entirety.

Processor 106 may make a determination as to whether the optimization should be prematurely stopped (step 316). The optimization may be prematurely stopped when user defined criteria has been exceeded/violated. For example, the optimization may be stopped when the processing time has exceeded a time limit, or when the size of the problem has exceeded a certain size.

If the optimization should not be stopped prematurely and if the proposed flight assignments and maintenance scheduling assignments do not meet a decision criteria (step 318), then processor 106 may generate additional aircraft routing proposals and maintenance scheduling proposals. The decision criteria in the present example may maximize net revenues when assigning aircraft to flights over an airline's entire flight schedule. Processor 106 addresses this decision criteria in the objective function (Equation OF1) of the master problem. As one of ordinary skill in the art will appreciate, when applying an algorithm, such as the revised simplex method, to solve the master problem, dual variables of the model constraints are used to indicate whether the objective function has been maximized. In this example, the objective function expresses the total net revenue for assigning all the given aircraft to the scheduled flights. In another example, other decision criteria, such as efficiency, gross revenue, etc., may be selected by a user for optimization instead.

The additional aircraft routing proposals may be generated by first generating refinement information used by the sub-problems to determine additional proposed routings for the aircraft (step 320). The refinement information may be dual variables found by the revised simplex procedure at step 314. From the dual variables, the processor 106 may update the underlying structure of the sub-problem for each aircraft. For example, a dual variable related to aircrafts (hereinafter "aircraftdual"), a dual variable related to flights (hereinafter "flightdual"), and a dual variable related to maintenance (hereinafter "maintenancedual") may be used to adjust corresponding objective values. Specifically, aircraftdual may be used to adjust aircraft objective values, flightdual may be used to adjust flight objective values, and maintenancedual may be used to adjust maintenance objective values. The aircraftdual variable may be determined from the aircraft flow constraint (MRM1) in the master problem. The flightdual variable may be determined from the flight covering constraint (MRM2) in the master problem. The maintenancedual variable may be determined from the maintenance capacity constrain (MRM3) in the master problem.

After generating the refinement information at step 320, the processor 106 returns to step 312 to generate an additional aircraft routing proposal and maintenance scheduling proposal based on the generated refinement information. The processor 106 may determine additional proposals back at step 312 by solving the updated sub-problem using a constraint programming procedure or any algorithm previously described. The processor 106 uses the additional aircraft routing proposal and maintenance scheduling proposal to update the master problem via column generation in Dantzig-Wolfe decomposition.

More particularly, during the column generation process, the dual variables (e.g., multipliers) are used to price out the non-basic variables (e.g., columns) by considering their reduced costs. The dual variables ensure that the reduced cost for every variable in the basis is zero. If any reduced cost is of the wrong sign in the restricted master problem, the process will introduce the corresponding non-basic variable into the basis in place of one of the current basic variables, and recompute the simplex multipliers (i.e., dual variables). In order to use column generation in the Dantzig-Wolfe method, the columns need to have structural characteristics which allow the pricing out of operations without explicitly considering every possible column in the problem.

By inserting this column into the basis to create an updated master problem, there will be an improvement to the objective function (Equation OF1) of the master problem.

Using the updated master problem, the processor 106 determines revised flight assignments and maintenance scheduling assignments (step 314). If the processor 106 determines at step 318 that the revised flight assignments do not meet the decision criteria, then the processor 106 repeats steps 312 to 320 until it determines a suggested flight assignment and maintenance scheduling assignment and corresponding aircraft routing and maintenance scheduling proposals that meet the decision criteria. Once the decision criteria is met or a determination is made that optimization should be prematurely stopped, no more additional proposals may be determined.

The processor 106 then determines a flight assignment plan and maintenance scheduling plan from the final flight assignment and maintenance scheduling assignment suggestions that meet the decision criteria (step 322). Since the Dantzig-Wolfe decomposition and revised simplex method operate with real numbers, the final flight assignment proposal may contain fractional numbers that are not applicable to the real world. For example, the assignment process may propose assigning one-half of an aircraft to a route because the mathematics of the problem dictates this meets the decision criteria. However, half an aircraft can not be assigned in the real world. Therefore, at step 322, processor 106 uses the final flight assignment and maintenance scheduling suggestions to solve the master problem to integrality (i.e., solve the master problem such that only whole aircraft are assigned to routes), of which the solution contains the flight assignment plan and maintenance scheduling plan. As one of ordinary skill in the art will appreciate, this may be done using the branch and bound method described on pp. 387–395 by Stephen P. Bradley, Arnoldo C. Hax, and Thomas L. Magnanti cited above and is incorporated herein by reference in its entirety.

Once the processor 106 generates the flight assignment plan and maintenance scheduling plan, it may store the plan in the flight assignment plan and maintenance database 110.

The plans may be accessed by others, such as the flight information display system 112. All operational departments within the airline will have access to the schedule plan via the flight information display system 112, in order to make resource management decisions such as gate assignment, and man-power staffing.

If for any reason the flight assignment plan and/or maintenance scheduling plan need to be modified, the information (flight, aircraft, maintenance, passenger, etc.) contained in the flight management/operations computer 102 may be modified and new plans may be generated as described above.

With regard to the aircraft routing and maintenance scheduling system 100, it is understood that one of ordinary skill in the art may implement features and principles of the present invention with alternative systems. Alternative systems may comprise one or more processors for implementing the exemplary method illustrated in FIGS. 3A and 3B.

Further, in receiving information as part of processing step 302, the functions of the alternative systems may include accessing/obtaining data from a database, data structure, storage medium, survey, and/or any other mechanism or combination of mechanisms. The received data may be raw data, such as data entries from a database, preprocessed data, such as encoded raw data, or any other form of data. "Receiving" data may include at least one of acquisition via a network, via verbal communication, via electronic transmission, via telephone transmission, in hard-copy form, or through any other mechanism enabling reception. In addition, "receiving" may occur either directly or indirectly. For example, receipt may occur through a third party acting on another party's behalf, as an agent of another, or in concert with another. Regardless, all such indirect and direct actions are intended to be covered by the term "receiving" as used herein.

Received data may take one of many exemplary forms. It may simply be a checked box, clicked button, submitted form, or oral affirmation. Or it might be typed or handwritten textual data. Receiving may occur through an on-line form, e-mail, facsimile, telephone, interactive voice response system, or file transfer protocol transmitted electronically over a network at a web site, an internet protocol address, or a network account. Receipt may occur physically such as in hard copy form, via mail delivery, or other courier delivery. "Receiving" may involve receipt directly or indirectly through one or more networks and/or storage media previously described.

In the foregoing description, it should be apparent to ones of ordinary skill in the art that features and principles of the present invention may generate a flight assignment plan and maintenance scheduling that can retain all scheduled departure times, swap aircraft within a given sub-fleet for a given flight, consider tail specific constraints, consider variable ranges for operating constraints in order to find feasible solutions, consider strategic flights assigned to a specific tail, incorporate all pre-assigned maintenance events, incorporate maintenance scheduling and/or rescheduling (station or time), consider all maintenance constraints (hangar capacity, capability, etc.), consider the number of booked passengers, and preserve pre-assigned through flights. Further it should be apparent, that the present invention has the capability to handle the ferrying of aircraft between airport stations, swap aircraft within the same equipment type and different seating capacity, swap aircraft across equipment types that share common crew ratings (adaptive aircraft assignment), and assign different aircraft types to flights such the there is no passenger spill (real-time fleet assignment). These situations would be handled by modifying the underlying sub-problem or master problem to include these capabilities. In each case, the present invention might be biased to maintain existing assignments between aircraft type and flights and would consider diverging from this only if it is beneficial to the overall solution process.

Consistent with principles of the present invention, elements of the present invention, including aircraft routing unit 202 and maintenance scheduling unit 204 may be implemented using the ILOG Optimization Suite (e.g., ILOG CPLEX, ILOG Solver, ILOG Dispatcher, or ILOG Scheduler); however, other constraint programming and mathematical programming commercial solvers may be used. For example, Dash Optimization's Xpress modeling and optimization software or IBM Solutions Optimization Solution MIP Solutions may be used in combination with Cosytec's CHIP, Delisoft Ltd's ICE, or Claire to implement the principles of the present invention.

While the present invention has been described in connection with a preferred embodiment, many modifications will be readily apparent to those skilled in the art, and this application is intended to cover any adaptations or variations thereof. For example, the present invention may be applied to any type of transportation network in addition to airlines, such as those that include land and/or sea components. One skilled in the art will appreciate that all or part of the systems and methods consistent with the present invention may be stored on or read from computer-readable media, such as secondary storage devices, like hard disks, floppy disks, and CD-ROM; a carrier wave received from a network such as the Internet; or other forms of ROM or RAM. This invention should be limited only by the claims and equivalents thereof.

What is claimed is:

1. A method to be used in a computer system for routing and scheduling maintenance for aircraft, comprising:

generating an aircraft routing proposal based on information describing a possible flight of an aircraft;

generating a maintenance scheduling proposal that corresponds to the aircraft based on information describing a possible maintenance schedule of the aircraft, wherein the information describing a possible maintenance schedule of the aircraft at least includes maintenance station capacity information;

determining a proposed pre-flight assignment and proposed maintenance scheduling assignment based on the aircraft routing proposal and maintenance scheduling proposal;

determining whether the proposed pre-flight assignment and proposed maintenance scheduling assignment meet a decision criterion describing requirements for aircraft routing and maintenance scheduling;

optimizing, based on a determination that the decision criterion is not met, the proposed pre-flight assignment and proposed maintenance scheduling assignment so that the decision criterion is met; and generating a pre-flight assignment plan and maintenance scheduling plan using the proposed pre-flight assignment and proposed maintenance scheduling assignment that met the decision criterion wherein the generating, determining and optimizing steps are performed by a processor.

2. The method of claim 1, wherein the aircraft routing proposal and maintenance scheduling proposal are generated based on constraint programming techniques.

3. The method of claim 1, wherein the aircraft routing proposal and maintenance scheduling proposal are generated subject to constraints.

4. The method of claim 3, wherein the constraints include at least one of aircraft constraints, operational constraints, maintenance constraints, hangar constraints, vehicle constraints, spacial sequence constraints, temporal constraints, and vehicle compatibility constraints.

5. The method of claim 1, wherein the aircraft routing proposal and maintenance scheduling proposal are generated based on search goals.

6. The method of claim 1, wherein the optimizing comprises:
- producing refinement information;
- generating an additional aircraft routing proposal and an additional maintenance scheduling proposal;
- determining a revised flight assignment and a revised maintenance scheduling assignment based on the additional aircraft routing proposal and additional maintenance scheduling proposal; and
- deciding whether the revised flight assignment and revised maintenance scheduling assignment meet the decision criterion.

7. The method of claim 6, wherein the proposed flight assignment and maintenance scheduling assignment are generated using a revised simplex algorithm and the refinement information is generated from dual variables found in the revised simplex algorithm.

8. The method of claim 7, wherein the decision criterion is met when no more additional aircraft routing proposals and additional maintenance scheduling proposals are determined based on the refinement information.

9. The method of claim 1, wherein the information describing the possible flight of the aircraft includes at least one of flight information, aircraft information, and maintenance event information.

10. The method of claim 9, wherein the flight information includes at least one of flight origin, destination, start time, end time, block time, booked passenger loads, passenger revenue/fare, assigned aircraft family type, assigned crew rating, minimum equipment list restrictions, and operating restrictions.

11. The method of claim 9, wherein the aircraft information includes at least one of tail identification, aircraft maintenance group, hourly operating cost, current location, ready time, remaining flight time, passenger capacity, aircraft family type, crew rating, and maintenance equipment list capability.

12. The method of claim 9, wherein the maintenance event information includes at least one of aircraft tail, type of maintenance check, scheduled location, start time, and end time.

13. The method of claim 1, wherein the information describing a possible maintenance schedule of the aircraft includes at least one of maintenance counter information, maintenance rule information, and maintenance station capability information.

14. The method of claim 13, wherein the maintenance counter information includes at least one of aircraft tail, type of maintenance check, calendar date, block dine, flying time, and remaining flying cycles.

15. The method of claim 13, wherein the maintenance rule information includes at least one of aircraft maintenance group, type of maintenance check, maintenance event duration, physical capacity, required man power, calendar date) block time, flying time, and flying cycles between checks.

16. The method of claim 13, wherein the maintenance station capability information includes at least one of airport code, physical capacity, man power capacity, effective date, and discontinuous date.

17. The method of claim 1, wherein the maintenance station capacity information includes at least one of airport code, airport maintenance group, maintenance check type, effective date, and discontinuous date.

18. The method of claim 1, wherein the flight assignment plan and maintenance scheduling plan are generated using a branch and bound method.

19. A method to be used in a computer system for routing and scheduling maintenance for aircraft, comprising:
- receiving information describing a possible flight of an aircraft and a possible maintenance schedule of the aircraft, wherein the information describing a possible maintenance schedule of the aircraft at least includes maintenance station capacity information;
- generating a set of aircraft routing proposals and maintenance scheduling proposals based on the received information;
- inputting the proposals into an optimization-based model; and
- producing a pre-flight assignment plan and maintenance scheduling plan by solving the optimization-based model wherein the receiving, generating, inputting and producing steps are performed by a processor.

20. An apparatus for routing and scheduling maintenance for aircraft, comprising:
- means for receiving information describing a possible flight of an aircraft and a possible maintenance schedule of the aircraft, wherein the information describing a possible maintenance schedule of the aircraft at least includes maintenance station capacity information;
- means for generating a set of aircraft routing proposals and maintenance scheduling proposals based on the received information;
- means for inputting the proposals into an optimization-based model; and
- means for producing a pre-flight assignment plan and maintenance scheduling plan by solving the optimization-based model wherein the means for receiving, generating, inputting and producing are performed by a processor.

21. A method to be used in a computer system for routing and scheduling maintenance for aircraft, comprising:
- generating an aircraft routing proposal based on information describing a possible flight of an aircraft;
- generating a maintenance scheduling proposal that corresponds to the aircraft based on information describing a possible maintenance schedule of the aircraft, wherein the information describing a possible maintenance schedule of the aircraft at least includes maintenance station capacity information;
- determining a proposed pre-flight assignment and proposed maintenance scheduling assignment based on the aircraft routing proposal and maintenance scheduling proposal; and
- producing a pre-flight assignment plan and maintenance scheduling plan using the proposed pre-flight assignment and proposed maintenance scheduling assignment when the proposed pre-flight assignment and proposed maintenance scheduling assignment meet a decision criterion describing requirements for aircraft routing and maintenance scheduling wherein the generating, determining and producing steps are performed by a processor.

22. An apparatus for routing and scheduling maintenance for aircraft, comprising:
- means for generating an aircraft routing proposal based on information describing a possible flight of an aircraft;

means for generating a maintenance scheduling proposal that corresponds to the aircraft based on information describing a possible maintenance schedule of the aircraft, wherein the information describing a possible maintenance schedule of the aircraft at least includes maintenance station capacity information;

means for determining a proposed pre-flight assignment and proposed maintenance scheduling assignment based on the aircraft routing proposal and maintenance scheduling proposal;

means for determining whether the proposed pre-flight assignment and proposed maintenance scheduling assignment meet a decision criterion describing requirements for aircraft routine and maintenance scheduling;

means for optimizing, based on a determination that the decision criterion is not met the proposed pre-flight assignment and proposed maintenance scheduling assignment so that the decision criterion is met; and means for generating a pre-flight assignment plan and maintenance scheduling plan using the proposed pre-flight assignment and proposed maintenance schedule that met the decision criterion wherein the means for receiving, generating, optimizing and determining are performed are performed by a processor.

23. The apparatus of claim 22, wherein the aircraft routing proposal and maintenance scheduling proposal are generated based on constraint programming techniques.

24. The apparatus of claim 22, wherein the aircraft routing proposal and maintenance scheduling proposal are generated subject to constraints.

25. The apparatus of claim 24, wherein the constraints include at least one of aircraft constraints, operational constraints, maintenance constraints, hangar constraints, vehicle constraints, spacial sequence constraints, temporal constraints, and vehicle compatibility constraints.

26. The apparatus of claim 22, wherein the aircraft routing proposal and maintenance scheduling proposal are generated based on search goals.

27. The apparatus of claim 22, wherein the means for optimizing comprises:

means for producing refinement information;

means for generating an additional aircraft routing proposal and an additional maintenance scheduling proposal;

means for determining a revised flight assignment and a revised maintenance scheduling assignment based on the additional aircraft routing proposal and additional maintenance scheduling proposal; and means for deciding whether the revised flight assignment and revised maintenance scheduling assignment meet the decision criterion.

28. The apparatus of claim 27, wherein the proposed flight assignment and maintenance scheduling assignment are generated using a revised simplex algorithm and the refinement information is generated from dual variables found in the revised simplex algorithm.

29. The apparatus of claim 28, wherein the decision criterion is met when no more additional aircraft routing proposals and additional maintenance scheduling proposals are determined based on the refinement information.

30. The apparatus of claim 22, wherein the information describing the possible flight of the aircraft includes at least one of flight information, aircraft information, and maintenance event information.

31. The apparatus of claim 30, wherein the flight information includes at least one of flight origin, destination, start time, end time, block time, booked passenger loads, passenger revenue/fare, assigned aircraft family type, assigned crew rating, minimum equipment list restrictions, and operating restrictions.

32. The apparatus of claim 30, wherein the aircraft information includes at least one of tail identification, aircraft maintenance group, hourly operating cost, current location, ready time, remaining flight time, passenger capacity, aircraft family type, crew rating, and maintenance equipment list capability.

33. The apparatus of claim 30, wherein the maintenance event information includes at least one of aircraft tail, type of maintenance check, scheduled location, start time, and end time.

34. The apparatus of claim 22, wherein the information describing a possible maintenance schedule of the aircraft includes at least one of maintenance counter information, maintenance rule information, and maintenance station capability information.

35. The apparatus of claim 34, wherein the maintenance counter information includes at least one of aircraft tail, type of maintenance check, calendar date, block time, flying time, and remaining flying cycles.

36. The apparatus of claim 34, wherein the maintenance rule information includes at least one of aircraft maintenance group, type of maintenance check, maintenance event duration, physical capacity, required man power, calendar date, block time, flying time, and flying cycles between checks.

37. The apparatus of claim 34, wherein the maintenance station capability information includes at least one of airport code, physical capacity, man power capacity, effective date, and discontinuous date.

38. The apparatus of claim 22, wherein the maintenance station capacity information includes at least one of airport code, airport maintenance group, maintenance check type, effective date, and discontinuous date.

39. The apparatus of claim 22, wherein the flight assignment plan and maintenance scheduling plan are generated using a branch and bound method.

40. A computer-readable medium containing instructions for performing a method for routing and scheduling maintenance for aircraft, the method comprising:

generating an aircraft routing proposal based on information describing a possible flight of an aircraft;

generating a maintenance scheduling proposal that corresponds to the aircraft based on information describing a possible maintenance schedule of the aircraft wherein the information describing a possible maintenance schedule of the aircraft at least includes maintenance station capacity information;

determining a proposed pre-flight assignment and proposed maintenance scheduling assignment based on the aircraft routing proposal and maintenance scheduling proposal;

determining whether the proposed pre-flight assignment and proposed maintenance scheduling assignment meet a decision criterion describing requirements for aircraft routing and maintenance scheduling;

optimizing, based on a determination that the decision criterion is not met, the proposed pre-flight assignment and proposed maintenance scheduling assignment so that the decision criterion is met; and generating a pre-flight assignment plan and maintenance scheduling plan using the proposed pre-flight assignment and proposed maintenance schedule that met the decision criterion wherein the generating, determining and optimizing steps are performed by a processor.

41. An apparatus for performing a method for routing and scheduling maintenance for aircraft, comprising:

a memory having a program that: generates an aircraft routing proposal based on information describing a possible flight of an aircraft; generates a maintenance scheduling proposal that corresponds to the aircraft based on information describing a possible maintenance schedule of the aircraft, wherein the information describing a possible maintenance schedule of the aircraft at least includes maintenance station capacity information; determines a proposed pre-flight assignment and proposed maintenance scheduling assignment based on the aircraft routing proposal and maintenance scheduling proposal; determines whether the proposed pre-flight assignment and proposed maintenance scheduling assignment meet a decision criterion describing requirements for aircraft routing and maintenance scheduling; optimizes, based on a determination that the decision criterion is not met, the proposed pre-flight assignment and proposed maintenance scheduling assignment so that the decision criterion is met; and generates a pre-flight assignment plan and maintenance scheduling plan using the proposed pre-flight assignment and proposed maintenance schedule that met the decision criterion; and a processor that runs the program.

42. An apparatus for routing and scheduling maintenance for aircraft, comprising:

means for generating an aircraft routing proposal based on information describing a possible flight of an aircraft;

means for generating a maintenance scheduling proposal that corresponds to the aircraft based on information describing a possible maintenance schedule of the aircraft, wherein the information describing a possible maintenance schedule of the aircraft at least includes maintenance station capacity information;

means for determining a proposed pre-flight assignment and proposed maintenance scheduling assignment based on the aircraft routing proposal and maintenance scheduling proposal; and means for producing a pre-flight assignment plan and maintenance scheduling plan using the proposed pre-flight assignment and proposed maintenance scheduling assignment when the proposed pre-flight assignment and proposed maintenance scheduling assignment meet a decision criterion describing requirements for aircraft routing and maintenance scheduling wherein the generating, determining and producing steps are performed by a processor.

43. A computer-readable medium containing instructions for performing a method for routing and scheduling maintenance for aircraft, the method comprising;

receiving information describing a possible flight of an aircraft and a possible maintenance schedule of the aircraft, wherein the information describing a possible maintenance schedule of the aircraft at least includes maintenance station capacity information;

generating a set of aircraft routing proposals and maintenance scheduling proposals based on the received information;

inputting the proposals into an optimization-based model; and producing a pre-flight assignment plan and maintenance scheduling plan by solving the optimization-based model wherein the receiving, generating, inputting and producing steps are performed by a processor.

44. A computer-readable medium containing instructions for performing a method for routing and scheduling maintenance for aircraft, the method comprising:

generating an aircraft routing proposal based on information describing a possible flight of an aircraft;

generating a maintenance scheduling proposal that corresponds to the aircraft based on information describing a possible maintenance schedule of the aircraft, wherein the information describing a possible maintenance schedule of the aircraft at least includes maintenance station capacity information;

determining a proposed pre-flight assignment and proposed maintenance scheduling assignment based on the aircraft routing proposal and maintenance scheduling proposal; and producing a pre-flight assignment plan and maintenance scheduling plan using the proposed pre-flight assignment and proposed maintenance scheduling assignment when the proposed pre-flight assignment and proposed maintenance scheduling assignment meet a decision criterion describing requirements for aircraft routing and maintenance scheduling wherein the generating, determining and producing steps are performed by a processor.

45. An apparatus for routing and scheduling maintenance for aircraft, comprising:

a memory having a program that receives information describing a possible flight of an aircraft and a possible maintenance schedule of the aircraft, wherein the information describing a possible maintenance schedule of the aircraft at least includes maintenance station capacity information; generates a set of aircraft routing proposals and maintenance scheduling proposals based on the received information; inputs the proposals into an optimization-based model; and produces a pre-flight assignment plan and maintenance scheduling plan by solving the optimization-based model; and a processor that runs the program.

46. An apparatus for routing and scheduling maintenance for aircraft, comprising:

a memory having a program that; generates an aircraft routing proposal based on information describing a possible flight of an aircraft; generates a maintenance scheduling proposal that corresponds to the aircraft based on information describing a possible maintenance schedule of the aircraft, wherein the information describing a possible maintenance schedule of the aircraft at least includes maintenance station capacity information; determines a proposed pre-flight assignment and proposed maintenance scheduling assignment based on the aircraft routing proposal and maintenance scheduling proposal; and produces a pre-flight assignment plan and maintenance scheduling plan using the proposed pre-flight assignment and proposed maintenance scheduling assignment when the proposed pre-flight assignment and proposed maintenance scheduling assignment meet a decision criterion describing requirements for aircraft routing and maintenance scheduling; and a processor that runs the program.

* * * * *

UNITED STATES PATENT AND TRADEMARK OFFICE

CERTIFICATE OF CORRECTION

PATENT NO. : 7,006,903 B2
APPLICATION NO. : 10/270000
DATED : February 28, 2006
INVENTOR(S) : Smith et al.

It is certified that error appears in the above-identified patent and that said Letters Patent is hereby corrected as shown below:

<u>Column 17,</u>
Line 57, "dine" should read --time--;
Line 62, ")" should read --,--.

Signed and Sealed this

Twenty-fifth Day of July, 2006

JON W. DUDAS
*Director of the United States Patent and Trademark Office*